US012071907B2

(12) United States Patent
Aoki et al.

(10) Patent No.: US 12,071,907 B2
(45) Date of Patent: Aug. 27, 2024

(54) CONTROL DEVICE FOR INTERNAL COMBUSTION ENGINE

(71) Applicant: TOYOTA JIDOSHA KABUSHIKI KAISHA, Toyota (JP)

(72) Inventors: Keiichiro Aoki, Shizuoka-ken (JP); Masato Ikemoto, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/366,138

(22) Filed: Aug. 7, 2023

(65) Prior Publication Data

US 2024/0141847 A1 May 2, 2024

(30) Foreign Application Priority Data

Oct. 26, 2022 (JP) ................................ 2022-171461

(51) Int. Cl.
*F02D 41/14* (2006.01)

(52) U.S. Cl.
CPC ..... *F02D 41/1454* (2013.01); *F02D 41/1495* (2013.01)

(58) Field of Classification Search
CPC ...... F01N 11/007; F01N 11/002; F01N 11/00; F01N 11/005; F01N 2560/025; F01N 2560/02; F01N 2430/06; F01N 2900/0416; F01N 2900/1602; F02D 41/1454; F02D 41/1495; F02D 41/1456; F02D 41/1444; F02D 41/22; F02D 41/222; Y02T 10/12; Y02T 10/40
See application file for complete search history.

(56) References Cited

U.S. PATENT DOCUMENTS 6,164,125 A * 12/2000 Kawase ............. G01N 27/4175 73/114.73
10,563,604 B2 * 2/2020 Hokuto ................. F02D 41/024
2011/0155113 A1 6/2011 Aoki
2013/0101474 A1 * 4/2013 Nakayama ......... B01D 53/9495 422/182
2013/0255232 A1 * 10/2013 Maeda ................ F02D 41/1455 60/276
2020/0141892 A1 * 5/2020 Aoki .................. G01N 27/4175

FOREIGN PATENT DOCUMENTS

WO 2010/041585 A1 4/2010

* cited by examiner

*Primary Examiner* — Dapinder Singh
(74) *Attorney, Agent, or Firm* — SoraIP, Inc.

(57) ABSTRACT

When the element temperature of the air-fuel ratio sensor becomes equal to or higher than the activation temperature, the electronic control unit starts the detection of the air-fuel ratio based on the sensor output of the air-fuel ratio sensor and the air-fuel ratio feedback control based on the detection result. The electronic control unit calculates the air-fuel ratio detection value by setting the gain of the air-fuel ratio detection value with respect to the sensor output when the sensor output is a value indicating the air-fuel ratio richer than the stoichiometric air-fuel ratio to a value smaller than that after the elapse of the synchronization period from the start of the air-fuel ratio until the element temperature becomes equal to or higher than the predetermined desorption convergence temperature.

5 Claims, 2 Drawing Sheets

CONTROL DEVICE FOR INTERNAL COMBUSTION ENGINE

CROSS-REFERENCE TO RELATED APPLICATION

This application claims priority to Japanese Patent Application No. 2022-171461 filed on Oct. 26, 2022, incorporated herein by reference in its entirety.

BACKGROUND

1. Technical Field

The present disclosure relates to a control device for an internal combustion engine that executes feedback control of an air-fuel ratio based on a detection result of an air-fuel ratio sensor.

2. Description of Related Art

The air-fuel ratio sensor used in the control device for the internal combustion engine as described above includes a detection element that generates an electromotive force in accordance with a difference in oxygen partial pressure between the ambient exhaust gas and the reference gas. The detection element is not activated under a certain temperature. Therefore, after the internal combustion engine is started, the control device starts the feedback control of the air-fuel ratio after the temperature of the detection element becomes equal to or higher than the activation temperature.

On the other hand, when the internal combustion engine is stopped, hydrocarbon (HC) components in the exhaust gas may be adsorbed to the detection element of the air-fuel ratio sensor. The adsorbed HC components start to desorb from the detection element as the temperature of the detection element increases to some extent. The detection element also generates the electromotive force by desorption of such HC components. As a result, a phenomenon called a cold shoot phenomenon occurs in which an output of the air-fuel ratio sensor is shifted to the rich side.

On the basis of the above, in a control device for an internal combustion engine described in WO 2010/041585, whether desorption of the HC components has converged based on the elapsed time after the internal combustion engine is started. That is, the control device determines that desorption of the HC components has converged when the elapsed time after the start has reached a predetermined time. Then, the control device starts the feedback-control of the air-fuel ratio when a determination is made that desorption of the HC components has converged and the temperature of the detection element is equal to or higher than the activation temperature.

SUMMARY

The temperature of the detection element may reach an activation temperature prior to the determination that desorption of the HC components has converged. In such a case, since the determination that the desorption has converged is not made, there is a period in which the feedback control of the air-fuel ratio cannot be executed although the detection element is activated.

The required time for desorption of the HC components from the detection element varies greatly depending on the amount of HC components adsorbed by the detection element when the internal combustion engine is started and transition of the temperature of the detection element after the internal combustion engine is started. Therefore, it is necessary to set the elapsed time after the start with which the determination that the desorption has converged is made to a relatively long time in consideration of variations in the required time of the desorption. Therefore, in the control device of the related art as described above, the start of the air-fuel ratio feedback control may be delayed.

A control device for an internal combustion engine that solves the above issue detects an air-fuel ratio by calculating an air-fuel ratio detection value based on a sensor output of an air-fuel ratio sensor installed in an exhaust passage of the internal combustion engine. Then, the control device executes air-fuel ratio feedback control based on a detection result of the air-fuel ratio. Further, when an element temperature of the air-fuel ratio sensor becomes equal to or higher than a predetermined activation temperature, the control device starts detection of the air-fuel ratio. Then, during a period from when the detection of the air-fuel ratio is started until a predetermined condition is satisfied, the control device for the internal combustion engine calculates the air-fuel ratio detection value while a gain of the air-fuel ratio detection value with respect to the sensor output when the sensor output is a value indicating an air-fuel ratio richer than a stoichiometric air-fuel ratio is set to a value smaller than a value after an elapse of the period.

The control device for the internal combustion engine detects the air-fuel ratio by calculating the air-fuel ratio detection value based on the sensor output of the air-fuel ratio sensor. Here, the sensor output indicating the air-fuel ratio on the rich side than the stoichiometric air-fuel ratio is referred to as a rich output. When the gain with respect to the rich output is made smaller and the air-fuel ratio detection value is calculated, the air-fuel ratio detection value takes a value indicating a rich air-fuel ratio having a degree of enrichment smaller than that of the air-fuel ratio originally indicated by the sensor output. Therefore, even when the sensor output is shifted to the rich side due to the cold shoot phenomenon, it is difficult to control the air-fuel ratio that is significantly shifted to the lean side than the stoichiometric air-fuel ratio by the air-fuel ratio feedback control. With the above, the air-fuel ratio feedback control can be executed even during a period in which a cold shoot phenomenon may occur. Therefore, the control device for the internal combustion engine has an effect that the air-fuel ratio feedback control can be started early after the internal combustion engine is started.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a control device for an internal combustion engine will be described in detail with reference to FIGS. 1 to 4.

Control Device of Internal Combustion Engine

Figure 1:
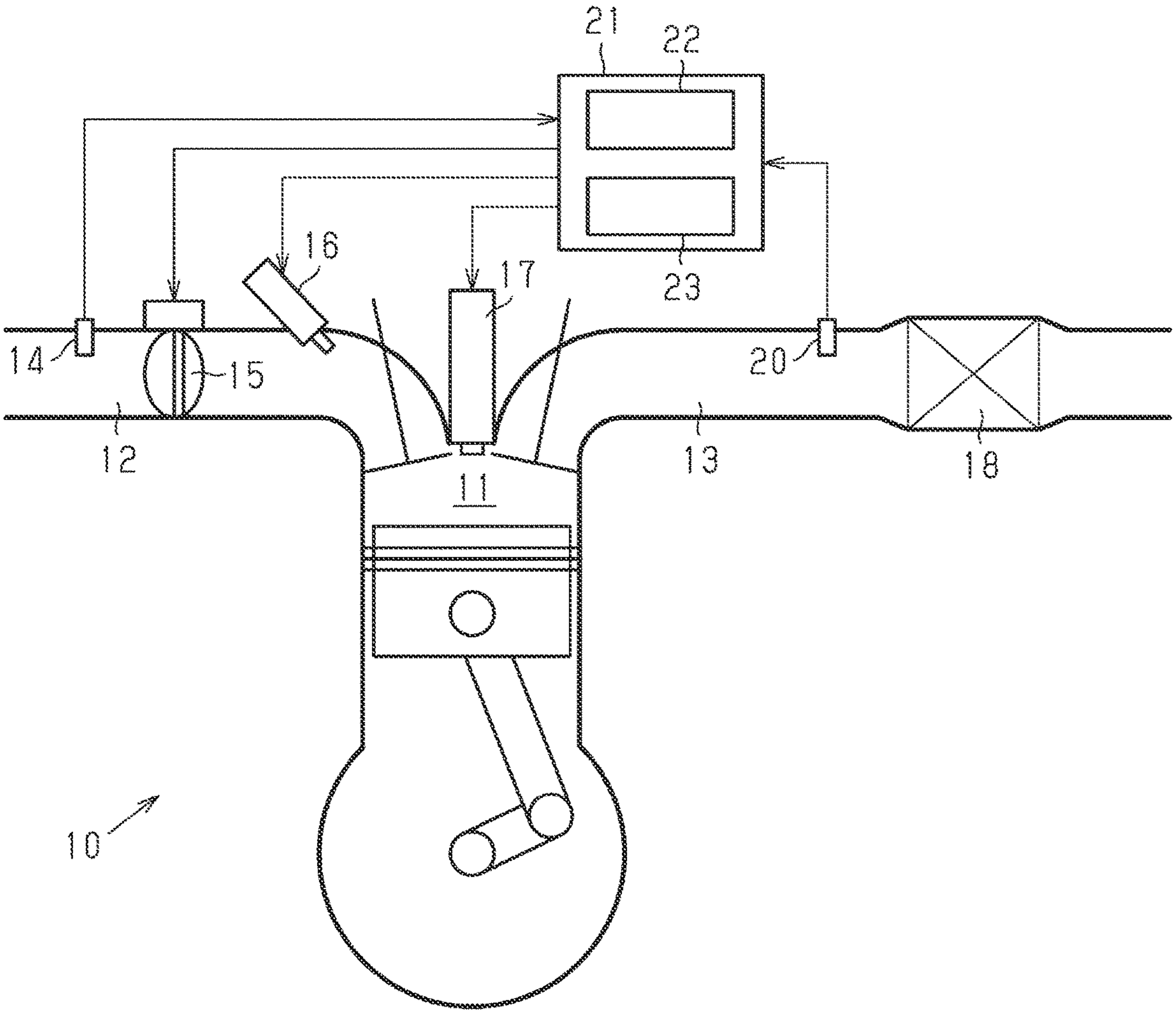
FIG. 1 is a diagram schematically illustrating a configuration of an embodiment of a control device for an internal combustion engine.

First, the configuration of the present embodiment will be described with reference to FIG. 1. The control device of the present embodiment controls the internal combustion engine 10 shown in FIG. 1. The internal combustion engine 10 includes a combustion chamber 11 in which the air-fuel mixture is combusted, and an intake passage 12 and an exhaust passage 13 connected to the combustion chamber 11. The intake passage 12 is an introduction passage for intake air to be used for combustion in the combustion chamber 11. The exhaust passage 13 is an exhaust passage of exhaust gas generated by combustion of the air-fuel mixture in the combustion chamber 11. Further, the internal combustion engine 10 includes an air flow meter 14 that detects an intake air flow rate of the intake passage 12, and a throttle valve 15 that is a valve for adjusting an intake air flow rate of the intake passage 12. Further, the internal combustion engine 10 includes an injector 16 that injects fuel into the intake air introduced into the combustion chamber 11, and an ignition device 17 that ignites the air-fuel mixture in the combustion chamber 11 by spark discharge. The internal combustion engine 10 further includes a catalyst device 18 for cleaning the exhaust gas flowing through the exhaust passage 13. An air-fuel ratio sensor 20 is installed in a portion of the exhaust passage 13 upstream of the catalyst device 18.

The internal combustion engine 10 is controlled by an electronic control unit 21 as a control device. The electronic control unit 21 includes a processing device 22 and a storage device 23. In the storage device 23, programs and data used for controlling the internal combustion engine 10 are stored in advance. The processing device 22 executes various processes for controlling the internal combustion engine 10 by executing a program read from the storage device 23.

Various sensors for detecting the operating state of the internal combustion engine 10 are connected to the electronic control unit 21. The sensors connected to the electronic control unit 21 include the air flow meter 14 and the air-fuel ratio sensor 20 described above. The electronic control unit 21 controls the operating state of the internal combustion engine 10 by operating the throttle valve 15, the injector 16, the ignition device 17, and the like based on the detection results of these sensors.

The electronic control unit 21 detects the air-fuel ratio of the air-fuel mixture burned in the combustion chamber 11 based on the output of the air-fuel ratio sensor 20. The electronic control unit 21 controls the internal combustion engine 10 based on the detection result of the air-fuel ratio.

Air-Fuel Ratio Feedback Control

The electronic control unit 21 performs feedback control of the air-fuel ratio of the air-fuel mixture to be combusted in the combustion chamber 11 based on the detection result of the air-fuel ratio by the air-fuel ratio sensor 20. In the air-fuel ratio feedback control, the electronic control unit 21 calculates the amount of air in the combustion chamber 11 based on the detection result of the air flow meter 14. Then, the electronic control unit 21 calculates, as a value of the base injection amount, an amount in which the ratio of the combustion chamber 11 to the air amount is the stoichiometric air-fuel ratio. The base injection amount is a feed-forward value of the fuel injection amount of the injector 16 to be fed back in the air-fuel ratio feedback control. Further, the electronic control unit 21 calculates a feedback correction value of the fuel injection amount based on a detection result of the air-fuel ratio by the air-fuel ratio sensor 20. Specifically, when the air-fuel ratio detection value is a value indicating the air-fuel ratio on the leaner side than the stoichiometric air-fuel ratio, the electronic control unit 21 calculates a positive value as the feedback correction value, that is, a value for correcting the positive value to the side of increasing the fuel injection amount. On the other hand, when the air-fuel ratio detection value is a value indicating the air-fuel ratio on the richer side than the stoichiometric air-fuel ratio, the electronic control unit 21 calculates a negative value as the feedback correction value, that is, a value for correcting the negative value to the side for reducing the fuel injection amount. The electronic control unit 21 then operates the injector 16 to inject an amount of fuel equal to the sum of the base injection amount and the feedback correction value. The electronic control unit 21 maintains the air-fuel ratio of the air-fuel mixture burned in the combustion chamber 11 at the stoichiometric air-fuel ratio by the air-fuel ratio feedback control. In the following description, the air-fuel ratio on the leaner side than the stoichiometric air-fuel ratio is referred to as a lean air-fuel ratio. Further, the air-fuel ratio on the richer side than the stoichiometric air-fuel ratio is referred to as a rich air-fuel ratio. Such air-fuel ratio feedback control is performed, for example, through PID control in which the air-fuel ratio detection value is set as a control amount, the stoichiometric air-fuel ratio is set as a target value, and the fuel injection amount is set as an operating amount.

Air-Fuel Ratio Sensor Configuration

Next, the configuration of the air-fuel ratio sensor 20 will be described with reference to FIG. 2. The air-fuel ratio sensor 20 includes a sensor element 30. The sensor element 30 has a solid electrolyte layer 31 made of a flat plate-like solid electrolyte containing zirconia as a main component. A diffusion controlling layer 34 is laminated on the surface of the solid electrolyte layer 31. The diffusion controlling layer 34 is a layer made of porous ceramics that restricts diffusion of gas molecules. A ceramic base material 35 made of an insulating ceramic material is laminated on the surface of the solid electrolyte layer 31 on the side opposite to the side where the diffusion controlling layer 34 is laminated. An electric heater 38 for heating the sensor element 30 is installed on the ceramic base material 35.

An exhaust chamber 36 and an atmospheric chamber 37 are provided inside the sensor element 30. The exhaust chamber 36 is a closed space surrounded by the solid electrolyte layer 31 and the diffusion controlling layer 34. The exhaust gas around the sensor element 30 is introduced into the exhaust chamber 36 through the diffusion-controlling layer 34. On the other hand, the atmospheric chamber 37 is a space surrounded by the solid electrolyte layer 31 and the ceramic base material 35, and is open to the atmosphere.

Further, the sensor element 30 is provided with an exhaust-side electrode 32 and an atmosphere-side electrode 33. The exhaust-side electrode 32 is provided so as to be exposed to the exhaust chamber 36 on the surface of the solid electrolyte layer 31 on the side where the diffusion-controlling layer 34 is stacked. On the other hand, the atmosphere-side electrode 33 is provided so as to be exposed to the atmospheric chamber 37 on the surface of the solid electrolyte layer 31 on the side where the ceramic base material 35 is laminated.

When a voltage is applied between the exhaust-side electrode 32 and the atmosphere-side electrode 33, oxygen ions move in the solid electrolyte layer 31 in accordance with the oxygen partial pressure difference between the exhaust chamber 36 and the atmospheric chamber 37. As a result, a current flows between the exhaust-side electrode 32 and the atmosphere-side electrode 33. In the following description, this current is referred to as a sensor current. The air-fuel ratio sensor 20 is provided with an ammeter 39 that detects a sensor current. The sensor current increases as the oxygen partial pressure difference between the exhaust chamber 36 and the atmospheric chamber 37 increases, and increases as the applied voltage between the electrodes increases. However, the movement of oxygen ions through the solid electrolyte layer 31 reduces the oxygen partial pressure difference between the exhaust chamber 36 and the atmospheric chamber 37. Further, the diffusion controlling layer 34 restricts the movement of the exhaust gas from the exhaust passage 13 to the exhaust chamber 36. Therefore, even if the applied voltage between the electrodes is increased to a certain extent or more, the sensor current is saturated and does not increase any more. In the following explanation, the value of the sensor current at this time is referred to as a limiting current value IL. The limit current value IL is proportional to the oxygen-partial pressure difference between the ambient air and the atmosphere around the sensor elements 30.

The air-fuel ratio sensor 20 measures the limit current value IL based on the transition of the sensor current when an AC voltage is applied between the exhaust-side electrode 32 and the atmosphere-side electrode 33. The air-fuel ratio sensor 20 sets the measured limit current value IL as a sensor output. In the case of the internal combustion engine 10 of FIG. 1, the air-fuel ratio sensor 20 reaches the exhaust gas having the same properties as the exhaust gas discharged from the combustion chamber 11 before passing through the catalyst device 18. In this case, the oxygen partial pressure difference between the atmosphere and the exhaust gas correlates with the air-fuel ratio of the air-fuel mixture combusted in the combustion chamber 11. Therefore, the sensor output is a value reflecting the air-fuel ratio of the air-fuel mixture combusted in the combustion chamber 11.

In the case of the air-fuel ratio sensor 20, the limit current value IL becomes "0" in the case of the stoichiometric air-fuel ratio, a positive value in the case of the lean air-fuel ratio, and a negative value in the case of the rich air-fuel ratio. In the following explanation, the sensor output ($IL=0$) corresponding to the stoichiometric air-fuel ratio is referred to as stoichiometric output. The sensor output ($IL<0$) corresponding to the rich air-fuel ratio is referred to as a rich output. Further, a sensor output ($IL>0$) corresponding to the lean air-fuel ratio is referred to as a lean output.

The electronic control unit 21 calculates the air excess rate λ based on the sensor output. In the air-fuel ratio feedback control, the electronic control unit 21 uses the calculated air excess ratio λ as the air-fuel ratio detection value. The air excess ratio λ is a ratio of the air amount of the air-fuel mixture to the stoichiometric air amount. The stoichiometric air volume is the minimum air volume required to fully combust all fuel in the air-fuel mixture. The air excess rate λ is equal to the actual air-fuel ratio divided by the stoichiometric air-fuel ratio.

Output Characteristics of the Air-Fuel Ratio Sensor

Figure 3:
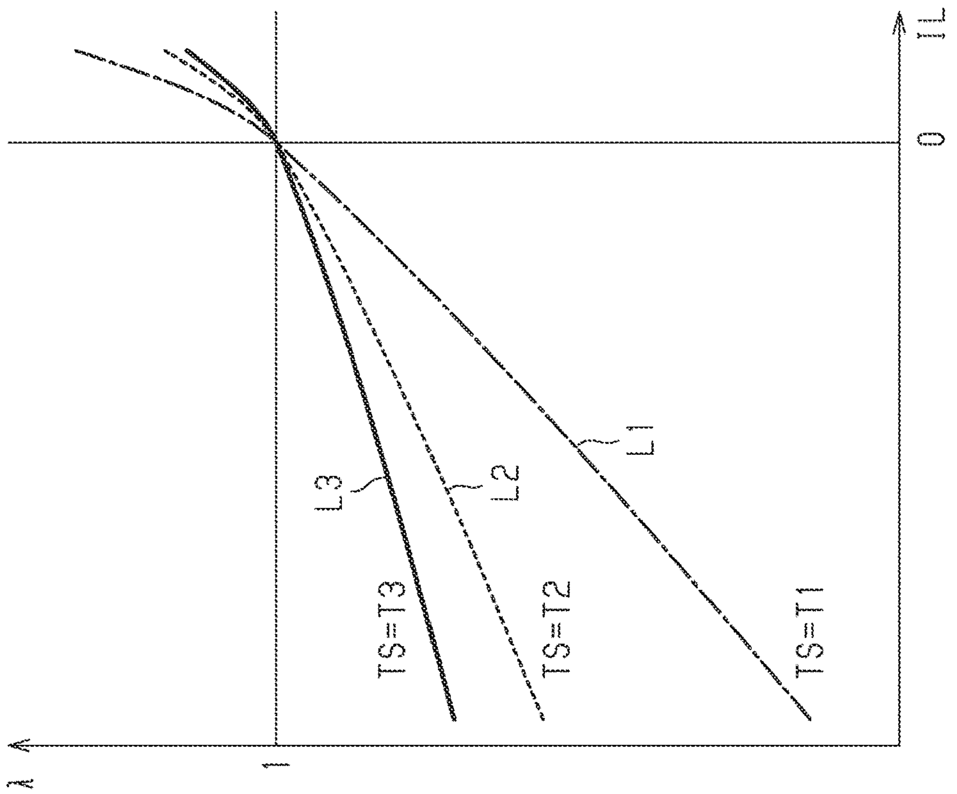
FIG. 3 is a graph showing the relation between the temperature of the air-fuel ratio sensor of FIG. 2 and the sensor output and the air-excess ratio.

Next, the output characteristics of the air-fuel ratio sensor 20 will be described with reference to FIG. 3. In the following explanation, the temperature of the sensor element 30 is referred to as an element temperature TS. FIG. 3 shows the relation between the limit current value IL and the air-excess ratio λ when the element temperature TS is T1 to T3. T1 to T3 are higher in the order of T1, T2, T3. In FIG. 3, the curve L1 shows the relation between the limit current value IL and the air-excess ratio λ when the element temperature TS is T1. The curve L2 shows the relation between the limit current value IL and the air-excess ratio λ when the element temperature TS is T2. Furthermore, the curve L3 shows the relation between the limit current value IL and the air-excess ratio λ when the element temperature TS is T3.

The lower the device-temperature TS, the higher the electric resistivity of the solid electrolyte layers 31 and the more difficult the sensor current flows. Therefore, the lower the element temperature TS, the larger the absolute value of the limit current value IL at the same air-excess rate λ.

The relation between the element temperature TS, the air-excess rate λ, and the limit current value IL can be determined in advance by experimentation or the like. Therefore, the air-excess ratio λ can be obtained based on the element temperature TS and the limit current value IL which is the sensor output. In addition, the element temperature TS can be determined based on, for example, the impedance of the solid electrolyte layers 31.

Cold Chute Phenomenon of the Air-Fuel Ratio Sensor

In the warm-up process of the air-fuel ratio sensor 20, a phenomenon occurs in which the output of the air-fuel ratio sensor 20 is shifted to the richer side than the value corresponding to the actual air-fuel ratio. This phenomenon is called the cold shoot phenomenon. Next, the cold chute phenomenon of the air-fuel ratio sensor 20 will be described.

Exhaust gas containing HC components remains in the exhaust passage 13 after the internal combustion engine 10 is stopped. While the internal combustion engine 10 is stopped, HC components in the exhaust gas may be adsorbed to the sensor elements 30 of the air-fuel ratio sensor 20. After the internal combustion engine 10 is started, the sensor element 30 gradually increases in temperature by receiving heat from the exhaust gas and heating the electric heater 38. HC components adsorbed to the sensor element 30 are desorbed from the sensor element 30 when the element thermal TS is higher than a certain level. At this time, the concentration of the unburned fuel component of the exhaust gas in the exhaust chamber 36 is higher than the concentration of the exhaust gas in the exhaust passage 13 because of the desorbed HC component. Therefore, when HC components are desorbed, the output of the air-fuel ratio sensor 20 is shifted to the rich side. The deviation of the output of the air-fuel ratio sensor 20 toward the rich side continues until the desorption of HC components from the sensor elements 30 converges.

HC components adsorbed to the sensor elements 30 include HC having a low carbon number and HC having a high carbon number such as aromatic hydrocarbons. The desorption of the carbon-rich HC occurs at a higher device-temperature TS than the desorption of the carbon-poor HC. Therefore, the cold shoot phenomena may occur in a wide element temperature TS ranging from a low element temperature TS in which a HC having a small carbon number is desorbed to a high element temperature TS in which a HC having a large carbon number is desorbed. In the following explanation, the element temperature TS when the desorption of the carbon-rich HC converges is referred to as the desorption convergence temperature TCO.

Detection of Air-Fuel Ratio

Next, the detection of the air-fuel ratio performed by the electronic control unit 21 based on the sensor output will be described with reference to FIG. 4. When the element temperature TS becomes equal to or higher than the activation temperature TAC of the sensor element 30, the electronic control unit 21 starts detecting the air-fuel ratio based on the sensor output. Further, the electronic control unit 21 starts the air-fuel ratio feedback control together with the detection of the air-fuel ratio.

In the air-fuel ratio detecting process, the electronic control unit 21 acquires the limit current value IL and the element temperature TS from the air-fuel ratio sensor 20 at predetermined control cycles. Then, the electronic control unit 21 detects the air-fuel ratio by calculating the air excess ratio λ based on the obtained limit current value IL and the element temperature TS. The electronic control unit 21 calculates the air excess rate λ with reference to a calculation map stored in advance in the storage device 23. The calculation map stores the value of the air-excess rate λ for each combination of the limit current value IL and the value of the device-temperature TS.

Figure 4:
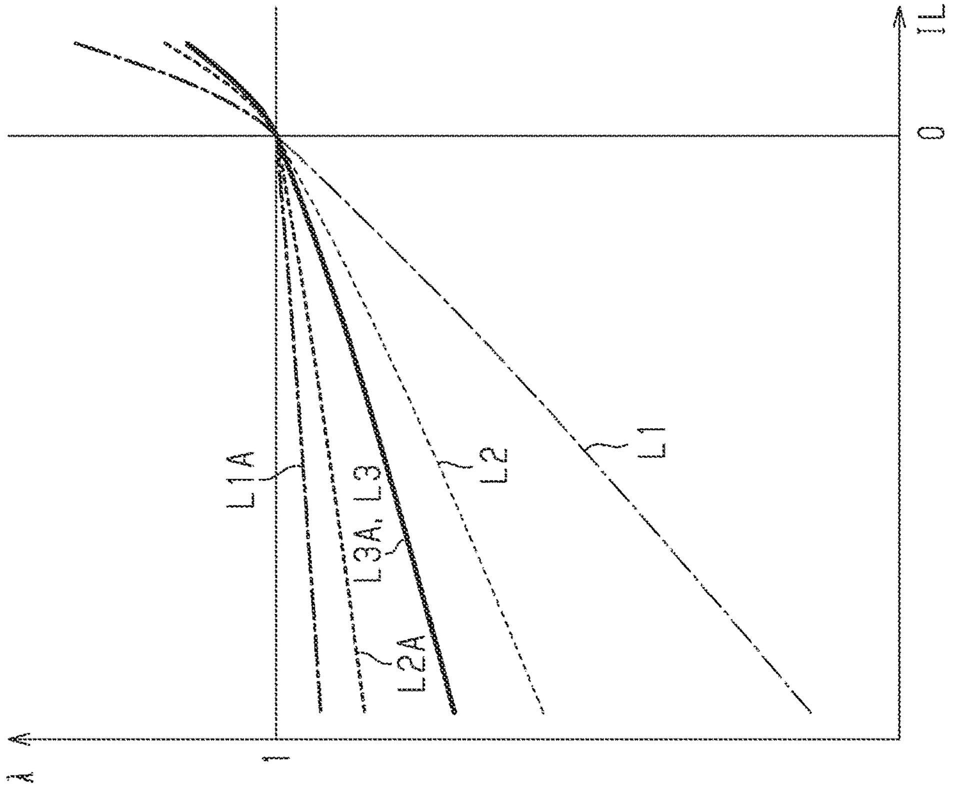
FIG. 4 is a graph showing the relationship between the element temperature and the sensor output and the air excess rate in the calculation map used by the control device of FIG. 1 to calculate the air excess rate.

FIG. 4 shows the relation between the respective limit current value IL and the air-excess ratio λ when the element-temperature TS in the operation map is T1 to T3. In FIG. 4, the curve L1A shows the relation between the limit current value IL and the air-excess ratio λ when the element temperature TS is T1. The curve L2A shows the relation between the limit current value IL and the air-excess ratio λ when the element temperature TS is T2. Furthermore, the curve L3A shows the relation between the limit current value IL and the air-excess ratio λ when the element temperature TS is T3.

The calculation map is set so as to reflect the output characteristic of the air-fuel ratio sensor 20 when the sensor output is the stoichiometric output or the lean output (IL≥0). Therefore, when the limit current value IL is 0 or more, the curve L1A to L3A in FIG. 4 is a curve overlapping from the curve L1 to L3 in FIG. 3. As described above, the air-fuel ratio sensor 20 has an output characteristic in which the sensor output at the same air-fuel ratio decreases as the element temperature TS decreases. Reflecting this, when the limit current value IL is a positive value, the electronic control unit 21 calculates the air excess rate λ by setting a value larger than the value when the element temperature TS is high to the gain of the air-fuel ratio detection value with respect to the sensor output when the element temperature TS is low. Here, the gain is a conversion coefficient of the sensor output to the air-fuel ratio. In the present embodiment, the value "G" satisfying the relation of Expression (1) with respect to the limiting current value IL and the air excess rate λ corresponds to the gain of the air-fuel ratio detection value with respect to the sensor output. Mathematical formula 1)

$$G=(\lambda-1)/IL \tag{1}$$

When the sensor output is a rich output (IL<0) and the element temperature TS is equal to or higher than the desorption convergence temperature TCO, the electronic control unit 21 sets the gain of the air-fuel ratio detection value to the sensor output so as to reflect the output characteristic of the air-fuel ratio sensor 20. For example, in FIG. 4, a curve L3A corresponding to a temperature "T3" higher than the desorption convergence temperature TCO is a curve overlapping the curve L3 of FIG. 3 corresponding to the same temperature "T3". On the other hand, when the sensor output is the rich output (IL<0), the electronic control unit 21 sets a value smaller than the value when the element temperature TS is equal to or higher than the desorption convergence temperature TCO as the gain of the air-fuel ratio detection value with respect to the sensor output when the element temperature TS is lower than the desorption convergence temperature TCO. That is, when the element temperature TS is less than the desorption convergence temperature TCO and the sensor output is a rich output (IL<0), the electronic control unit 21 calculates an air-fuel ratio having a degree of enrichment smaller than a value originally indicated by the sensor output as an air-fuel ratio detection value.

Operation and Effect of the Embodiment

After the start of the internal combustion engine 10, the electronic control unit 21 starts detecting the air-fuel ratio based on the sensor output when the element temperature TS of the air-fuel ratio sensor 20 becomes equal to or higher than the activation temperature TAC. Further, the electronic control unit 21 starts the air-fuel ratio feedback control together with the detection of the air-fuel ratio.

The electronic control unit 21 detects the air-fuel ratio by calculating the value of the air-fuel ratio λ used as the air-fuel ratio detection value based on the limit current value IL and the element temperature TS of the air-fuel ratio sensor 20. When the element temperature TS is less than the desorption convergence temperature TCO, the electronic control unit 21 sets the gain of the air-fuel ratio detection value with respect to the rich output to a value smaller than the value when the element temperature TS is equal to or higher than the desorption convergence temperature TCO, and calculates the air excess rate λ. After the start-up of the internal combustion engine 10, the element temperature TS rises through the activation temperature TAC to a temperature equal to or higher than the desorption convergence temperature TCO. Therefore, the electronic control unit 21 detects the air-fuel ratio by setting a value smaller than a value after the elapse of the synchronization period until the element temperature TS becomes equal to or higher than the desorption convergence temperature TCO to the gain of the air-fuel ratio detection value with respect to the rich output. That is, the electronic control unit 21 sets the gain of the air-fuel ratio detection value with respect to the rich output to a value smaller than the value after the elapse of the synchronization period until the element temperature TS becomes equal to or higher than the desorption convergence temperature TCO after the start of the detection of the air-fuel ratio, and calculates the air-fuel ratio detection value based on the sensor output.

As described above, the air-fuel ratio sensor 20 has an output characteristic that the lower the element temperature TS, the smaller the sensor output. Therefore, if the cold shoot phenomenon does not occur, it is desirable to set a larger value to the gain of the air-fuel ratio detection value with respect to the sensor output as the element temperature TS is lower regardless of the sensor output, and to detect the air-fuel ratio. However, in this case, when the cold shoot phenomenon occurs, the detection result of the air-fuel ratio is shifted to the rich side. In this case, a deviation of the detection result of the air-fuel ratio occurs in any of the following modes (1) to (3).

(1) The actual air-fuel ratio is a lean air-fuel ratio, and the detection result of the air-fuel ratio is also a lean air-fuel ratio, but the detection result underestimates the degree of lean air-fuel ratio.

(2) The actual air-fuel ratio is a lean air-fuel ratio, but the detection result of the air-fuel ratio is a rich air-fuel ratio.

(3) The actual air-fuel ratio is a rich air-fuel ratio, and the detection result of the air-fuel ratio is a rich air-fuel ratio, but the detection result overestimates the degree of enrichment of the air-fuel ratio. When the air-fuel ratio feedback control is executed in accordance with the detection result in the case of (2), the air-fuel ratio is controlled in a direction deviating from the stoichiometric air-fuel ratio. Further, when the air-fuel ratio feedback control is executed in accordance with the detection result in the case of (3), the air-fuel ratio is overcorrected to the air-fuel ratio on the leaner side than the stoichiometric air-fuel ratio. Therefore, in the case of (2) and (3), there is a possibility that the air-fuel ratio greatly deviates from the stoichiometric air-fuel ratio toward the lean side.

On the other hand, when the air-fuel ratio feedback control is executed in accordance with the detection result in the case of (1), the convergence speed becomes slow, but the air-fuel ratio can be controlled to the stoichiometric air-fuel ratio. Therefore, even when the detection result of the air-fuel ratio is shifted to the rich side due to the cold shoot phenomenon, the influence on the air-fuel ratio feedback control is limited when the sensor output is the lean output.

On the other hand, the electronic control unit 21 detects the air-fuel ratio by setting a value smaller than the elapse of the synchronization period to the gain of the air-fuel ratio detection value with respect to the rich output during a period from the beginning of the detection until the element temperature TS becomes equal to or higher than the desorption convergence temperature TCO. Therefore, the influence of the deviation of the detection result of the air-fuel ratio in the cases (2) and (3) on the air-fuel ratio feedback control is suppressed. Thus, the execution of the air-fuel ratio feedback control is allowed even during the period in which the cold shoot phenomenon occurs. That is, the air-fuel ratio feedback control can be started from an earlier time after the start of the internal combustion engine 10.

Also in such cases, during the period until the element temperature TS reaches the desorption convergence temperature TCO, the air-fuel ratio feedback control can be performed so as to correct at least the deviation of the air-fuel ratio toward the lean-side. Further, even if the cold shoot phenomenon occurs, it is possible to avoid a situation in which the air-fuel ratio greatly deviates from the stoichiometric air-fuel ratio toward the lean side. Therefore, the control device of the present embodiment can converge the air-fuel ratio to the stoichiometric air-fuel ratio at an earlier time than when the control is delayed until the desorption of HC components is converged or when the control is performed in accordance with the detection result of the air-fuel ratio shifted to the rich side due to the cold shoot phenomenon.

OTHER EMBODIMENTS

The present embodiment can be modified and implemented as follows. The present embodiment and modification examples described below may be carried out in combination of each other within a technically consistent range.

In a period in which the gain of the air-fuel ratio detection value with respect to the rich output is set to a small value, the gain of the air-fuel ratio detection value with respect to the lean output may also be set to a value smaller than that after the elapse of the synchronization period.

The air-fuel ratio itself instead of the air excess ratio λ may be determined as the air-fuel ratio detection value.

In the above-described embodiment, the period in which the value smaller than that after the lapse of the period is set to the gain of the air-fuel ratio detection value with respect to the rich output is ended when the element temperature TS becomes equal to or higher than the desorption convergence temperature TCO. That is, when the element temperature TS is equal to or higher than the desorption convergence temperature TCO, the above-described period is ended. The conditions for the end of such a period may be changed. For example, it is possible to predict, to some extent, the time when the desorption of HC components from the sensor elements 30 converges, based on the elapsed time from the start of the air-fuel ratio detection and the accumulated air volume after the start of the air-fuel ratio detection. Therefore, the condition of the end of the period may be that a predetermined time has elapsed from the start of the air-fuel ratio detection, or that the integrated air amount of the internal combustion engine 10 after the start of the air-fuel ratio detection becomes equal to or larger than a predetermined amount.

Figure 2:
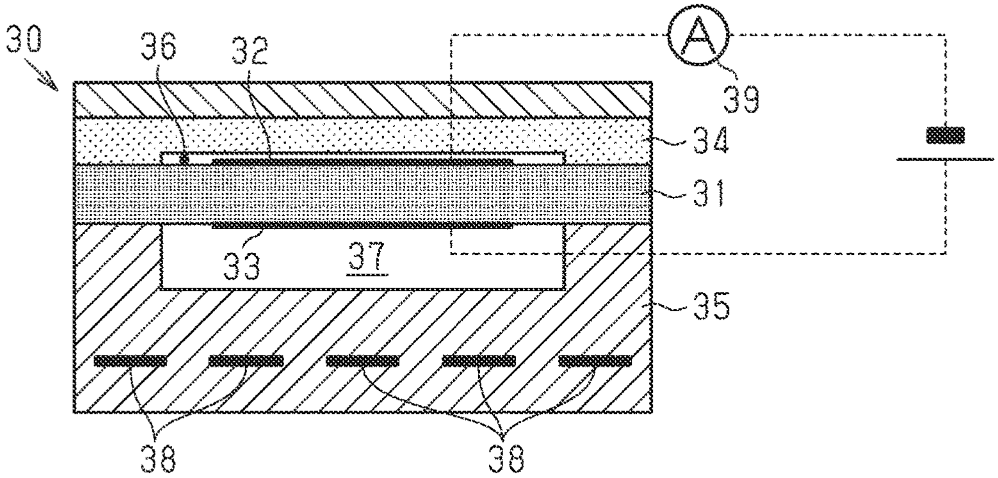
FIG. 2 is a diagram schematically showing a configuration of an air-fuel ratio sensor installed in an internal combustion engine controlled by the control device.

A sensor including a sensor element having a configuration different from that of the sensor element 30 shown in FIG. 2 may be employed as the air-fuel ratio sensor 20. In this case, the air-fuel ratio sensor 20 may be a sensor that generates a sensor output other than the limit current value IL.

In some cases, a sensor having a function similar to that of the air-fuel ratio sensor 20 is installed in a portion of the exhaust passage 13 on the downstream side of the catalyst device 18, and sub-feedback control of the air-fuel ratio is performed based on a detection result of the sensor. The exhaust gas reformed by the catalyst device 18 reaches such a sensor. Therefore, the sensor output of such a sensor does not necessarily reflect the air-fuel ratio of the air-fuel mixture burned in the combustion chamber 11. In the sub-feedback control of the air-fuel ratio, the air-fuel ratio of the exhaust gas after passing through the catalyst, which is an index value of the property of the exhaust gas that has passed through the catalyst device 18, is detected based on the sensor output of the sensor. Therefore, such a sensor is also included in the air-fuel ratio sensor. The process of detecting the air-fuel ratio in the above-described embodiment may be applied to the detection of the air-fuel ratio of the exhaust gas after passing through the catalyst based on the sensor output of the sensor.

What is claimed is:

1. A control device for an internal combustion engine, the control device comprising:

a processor, and a memory storing programs that cause the processor to execute following processes (i) to (iii):

(i) acquiring a sensor output value of an air-fuel ratio sensor installed in an exhaust passage of the internal combustion engine, the air-fuel ratio sensor including an element, (ii) detecting an air-fuel ratio by calculating an air-fuel ratio detection value based on the sensor output value and a gain, and (iii) executing a Proportional-Integral-Differential control as an air-fuel ratio feedback control based on the detected air-fuel ratio, wherein the program further causes the processor to start the processes (ii) and (iii) in a case where an element temperature of the air-fuel ratio sensor becomes equal to or higher than a predetermined activation temperature, and calculate the air-fuel ratio detection value during a period from when the processes (ii) and (iii) are started until a predetermined condition is satisfied, by setting the gain to a smaller value than a value of the gain after an elapse of the period, in a case where the sensor output value indicates that an air fuel ratio in the exhaust passage is richer than stoichiometric.

2. The control device according to claim 1, wherein the predetermined condition is satisfied upon the element temperature becoming equal to or higher than a predetermined aromatic hydrocarbons desorption convergence temperature.

3. The control device according to claim 1, wherein when the sensor output value is represented by a limit current value IL, the air-fuel ratio detection value is represented by an air excess ratio λ, and the gain is represented by G, the formula $\lambda = G \times IL + 1$ is satisfied.

4. The control device according to claim 1, wherein the predetermined condition is satisfied upon an integrated air amount of air taken into the internal combustion engine becoming equal to or larger than a predetermined amount.

5. The control device according to claim 1, in the Proportional-Integral-Differential control, the air-fuel ratio detection value is set as a control amount, the stoichiometric air-fuel ratio is set as a target value, and a fuel injection amount of fuel injected into the internal combustion engine is set as an operating amount.

* * * * *